Patented Feb. 6, 1923.

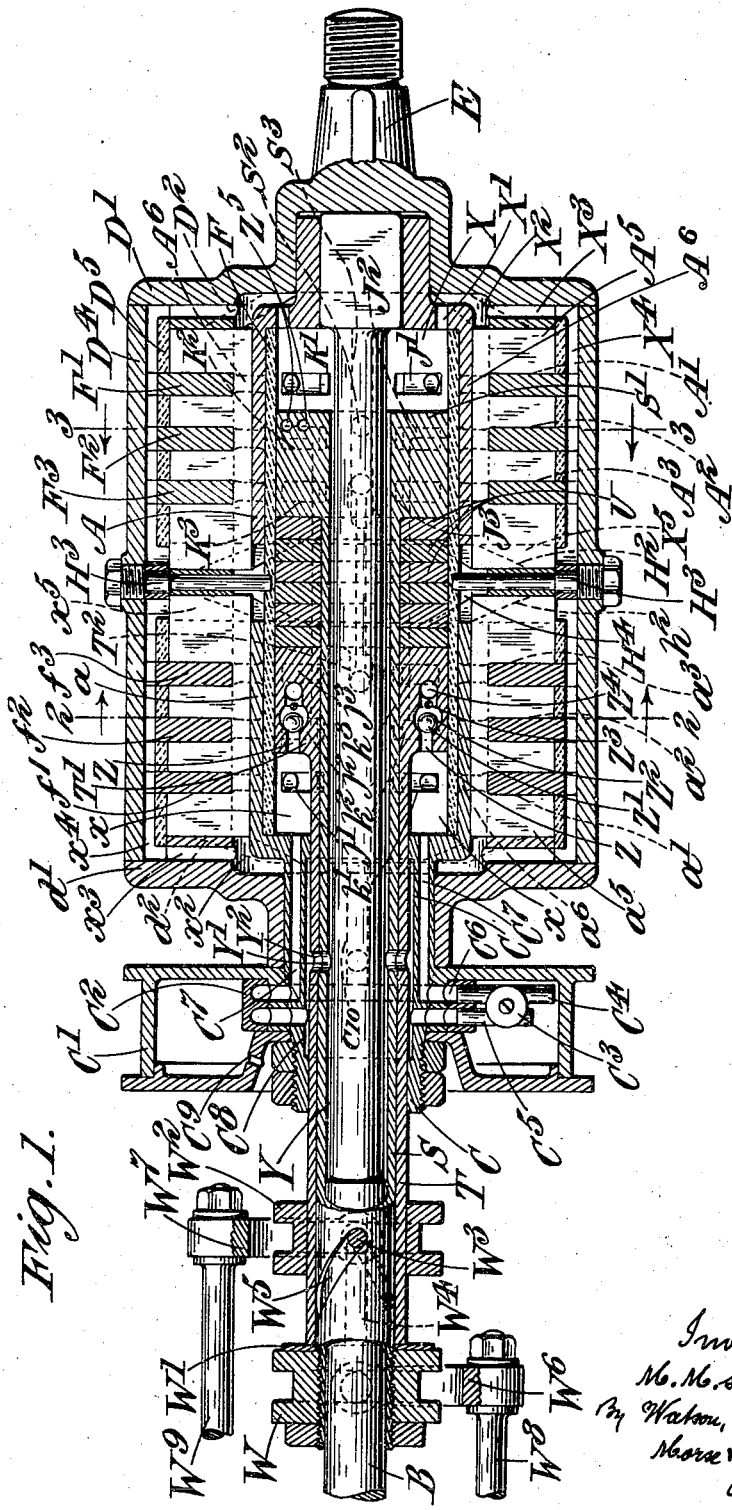

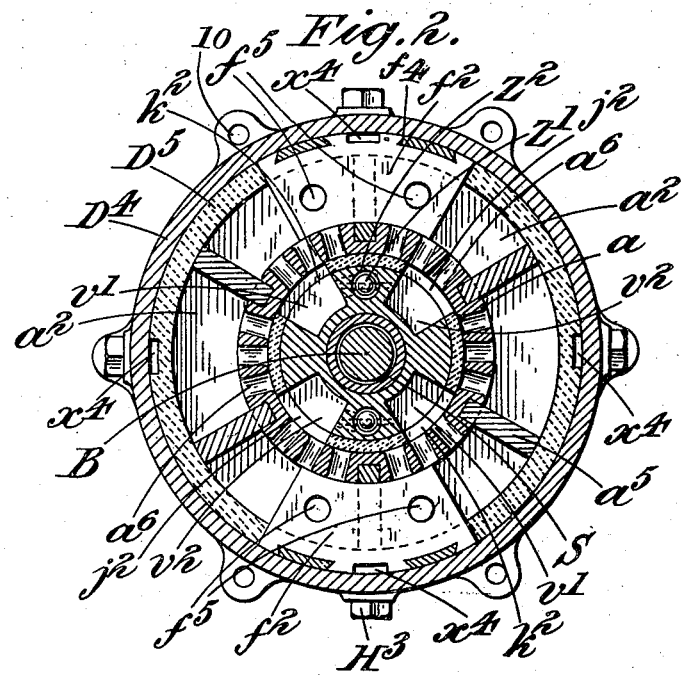
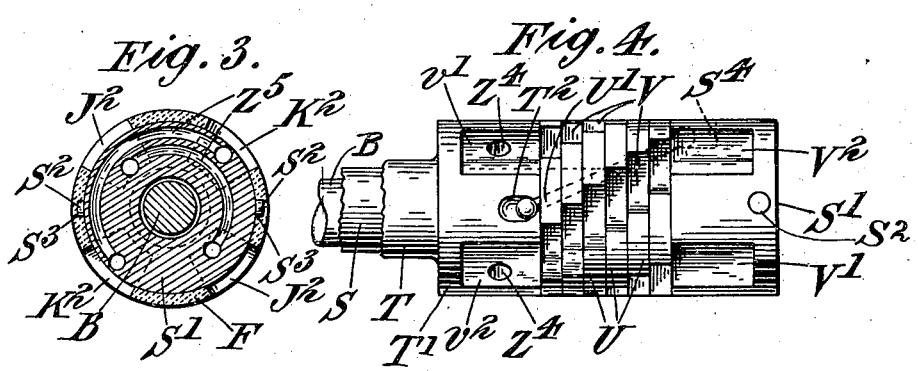

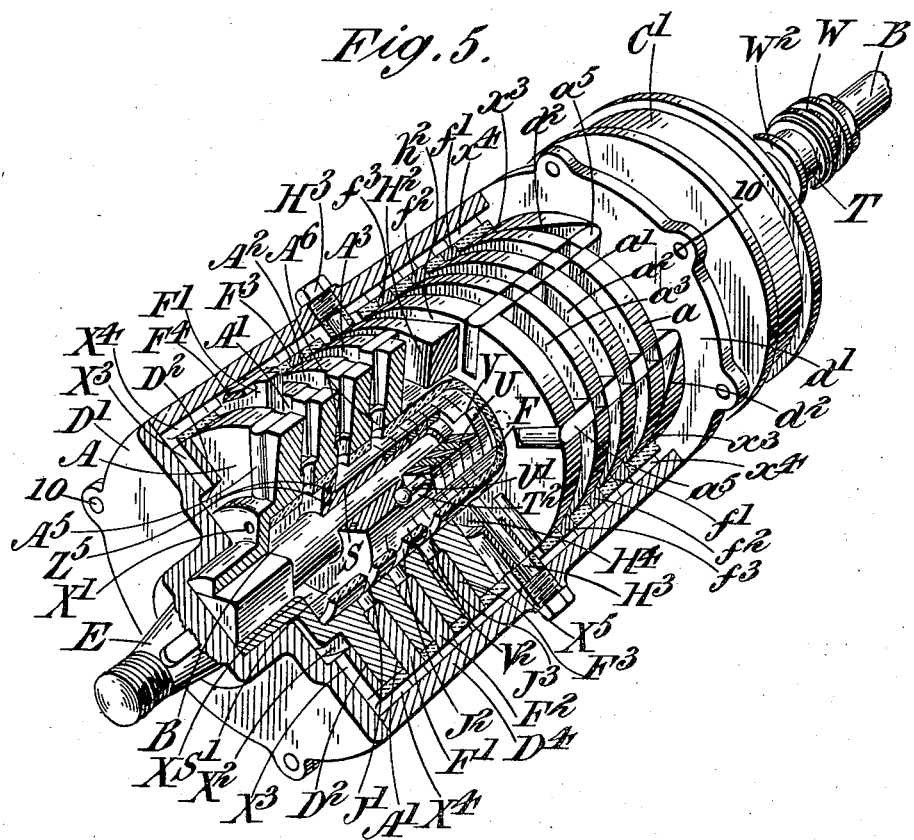

1,444,712

UNITED STATES PATENT OFFICE.

MAXWELL MABERLY SMITH, OF HENLEY-ON-THAMES, ENGLAND.

VARIABLE-SPEED GEAR.

Application filed April 19, 1922. Serial No. 555,634.

*To all whom it may concern:*

Be it known that I, MAXWELL MABERLY SMITH, a subject of the King of England, and residing at Henley-on-Thames, Oxfordshire, in England, have invented certain new and useful Improvements in Variable-Speed Gears, of which the following is a specification.

This invention relates to a device for transmission of power at variable speed ratios and particularly to that type of transmission devices in which a non-compressible fluid is forced through a motor by means of a pump driven by the prime mover.

The principal objects of the invention are to provide a transmission gear in which: working spaces of the pump and motor enlarge and diminish circumferentially, the moving parts are symmetrically arranged, and the moving parts and fluid pressures are at all times balanced; to provide novel means for controlling the speed ratio and direction of rotation; to provide a novel arrangement of parts in which friction losses are largely eliminated; to provide novel means for lubricating and supplying operative fluid to the gear; to provide novel means for insuring that fluid of maximum viscosity is always supplied to the gear; and to provide a novel arrangement for compensating for leakage.

An apparatus according to this invention comprises in general a driving shaft which operates a force pump to force fluid, preferably oil, into the motor. Theoretically, the motor rotates under the action of the motive fluid but practically it is preferable to hold the motor member stationary and to transmit power to a driven shaft which rotates differentially with respect to the prime mover and the stationary member through a unitary structure, comprising both pump and motor members. It is one object of my invention to provide such a unitary structure although the invention is not limited to such an embodiment.

Other objects and purposes of the invention will be apparent from the description and annexed drawings in which:

Figure 1 is a central longitudinal section of one form of the invention.

Figure 2 is a transverse section on the line 2—2 of Figure 1.

Figure 3 is a transverse section of the inner members on the line 3—3 of Figure 1.

Figure 4 is a plan of the valve member as adjusted for a reverse drive, and Figure 5 is a perspective view of the gear, parts thereof being broken away.

In general, the embodiment of the invention illustrated comprises a pump having two members which I shall term driver and rotor, and a motor having two members which I shall call stator and rotor. The pump and motor are in all respects similar to each other. The pump driver is rotated by the prime mover and the motor stator is held stationary in all cases except when transmitting direct drive, while the power is taken off of a casing in which the two rotors are combined as a single structure and which rotates differentially with respect to the driver and stator. A valve is provided which determines the direction of rotation of the rotor and which controls the amount of liquid used by the motor and thus controls the speed ratio.

The reference letters used to indicate the motor member and the parts associated therewith are all small letters, and these parts corresponding to the parts of the pump member indicated by the corresponding capital letters.

Referring to the drawings, the pump driver A is rigidly mounted on the driving shaft B of the prime mover and the motor stator $a$ is similarly mounted on a hollow shaft C which concentrically surrounds the driving shaft B. The pump and motor members are enclosed within a casing which combines the two rotors and is rigidly mounted on the driven shaft E. Alternatively the drive may be taken from the outside of the casing in any suitable manner, as for example, by means of a belt. The motor stator $a$ and its shaft C are normally held against rotation by means of a brake drum C' and the casing rotates differentially with respect to the driver and stator members. The casing is formed in two concentric parts $D^4$ $D^5$, and is closed by end plates D' $d'$ which carry cam surfaces $D^2$ and $d^2$ respectively. The end plates are fixed to the casing in any suitable manner not shown such as by bolts passing through the holes 10 and into corresponding lugs on the casing. Disposed between the pump driver A and the motor stator $a$ is a central cam block which is secured to the casing by means of four bolts $H^3$. Alternatively this block may be held in position in the casing by means of keys and keyways. The block carries cam surfaces $H^2$ $h^2$ respectively parallel to the cam surfaces $D^2$ $d^2$ on the end plates $D'$ $d'$.

The pump driver A comprises a cylindrical carrier block in which are cut three peripheral grooves $A'$ $A^2$ $A^3$ and a number of longitudinal grooves. The number of peripheral grooves is determined by the number of different speed ratios it is desired to obtain. The peripheral grooves form the working spaces of the pump and are divided into inlet and outlet chambers by abutments $F'$, $F^2$, $F^3$ which form part of the rotor. These abutments are fixed to the casing in any suitable manner and project into the peripheral grooves to the full depth thereof, forming in effect one end wall of each pressure chamber and being disposed symmetrically about the casing. The other end walls of the pressure chambers, that is, in effect the pistons, are formed by the teeth of the comb shaped vanes $A^5$ which are reciprocable in the longitudinal grooves of the pump member. When the vanes are in their outermost position the teeth close the peripheral grooves as in Figure 5 and as the pump is rotated they approach the abutments, thus decreasing circumferentially of the pump the effective length of the pressure chambers and forcing out the oil. As the teeth approach the abutments, the cam surfaces $D^2$ force the vanes to their innermost position where the spaces between the teeth register with the peripheral grooves and allow the vanes to pass by the abutments. After passing the abutments, the vanes are forced outward again by the cam surfaces $H^2$, and increase the distance between the abutments and the teeth, thus sucking oil into the chambers. This will be made clear by consulting Figure 5 in which the cam $D^2$ (of the motor member) is just starting to force one vane $A'$ to the left (inward) while one cam $h^2$ (cut away for the sake of clearness) has just finished forcing another vane $A^5$ to the right (outward). The vanes $A^5$ of the pump member are shown about in the position to pass by the abutments $F'$, $F^2$, $F^3$. The edges of the abutments inside the peripheral grooves are beveled to conform with the slopes of the cam surfaces $D^2$, $H^2$, a slight clearance being left to prevent wear on their surfaces and to allow the escape of any imprisoned fluid. Small grooves $F^5$ may also be made in the beveled edges to assist this action. As the edge of each vane passes the groove in the abutment, a small quantity of liquid in the corner is forced along the groove behind the vane.

Figure 2 shows a method of fastening the abutments to the casing. These abutments are secured to the inner part $D^5$ of the casing by means of keys $F^4$ and keyways. Alternatively the abutments may rest in slots in the inner casing part $D^5$, so as to be held against centrifugal movement by the outer part $D^4$ and against all other movement relative to the casing by the slots in the inner part $D^5$.

The motor stator $a$ is constructed in every way similarly to the pump driver A, the corresponding parts and the parts cooperating therewith being indicated by the corresponding small reference letters.

The cylindrical liner F is disposed concentrically within the pump and motor members A $a$ and is fixed to the casing $D^4$ $D^5$ by means of the same bolts $H^3$ which hold the central cam block. The pump and motor members A $a$ are thus disposed in the annular space between the casing $D^4$ $D^5$ and the liner F. This liner F is provided with outlet ports $J'$ $J^2$ $J^3$ $j'$ $j^2$ $j^3$ and inlet ports $K'$ $K^2$ $K^3$ $k'$ $k^2$ $k^3$ which communicate respectively with the outlet and inlet working chambers of the pump and motor members through a series of radial passages $A^6$ $a^6$ drilled through the carrier blocks of these members from the bases of the peripheral grooves $A'$ $A^2$ $A^3$ $a'$ $a^2$ $a^3$ to the inner surfaces. These radial passages $A^6$ $a^6$ are so spaced that there can be no flow of fluid between adjacent working chambers in the same groove. These passages form an important feature of the invention in that they allow the valve member to be disposed within the pump and motor members. The ports in the liner F are symmetrically disposed so that there are two diametrically opposite inlet ports and two diammetrically opposite outlet ports communicating with each peripheral groove. It is to be understood where it has not been specifically stated, that all the parts of the gear, which have already been described, are symmetrically arranged with respect to the axis of the gear.

The valve member is arranged within the cylindrical liner and concentrically surrounds the driving shaft B, and its construction will now be described in detail. Immediately surrounding the driving shaft B is a sleeve S which has a thickened portion $S'$ at its inner end. The diameter of this thickened portion $S'$ is such that it fits closely within the cylindrical liner F. It is also provided with studs $S^2$ which can move axially in slots $S^3$ in the cylindrical liner F. Thus the sleeve S, while being free to slide axially in the liner F, is carried round with the liner F and the casing $D^4$ $D^5$ as they rotate. Other means may be employed to effect the same end. Concentrically surrounding the sleeve S is another sleeve T, also provided at its inner end with a thickened portion $T'$ fitting closely within the cylindrical liner F. Between the two thickened portions $S'$ $T'$ are disposed a number of annular discs U which ride on the sleeve S and also fit closely into the liner F. These discs U have cut in them four symmetrically arranged slots V so that each disc has a shape somewhat resembling a Maltese cross. In the forward drive position these slots V are axially in line with one another and also with longitudinal slots V' V² and v' v² cut in the thickened portions S' and T' respectively. All these slots are so disposed as to register with the ports in the cylindrical liner F. Thus the slots V' and the adjacent slots V always register with the pump outlet ports J' J² J³, and the slots V² and the adjacent slots V with the pump inlet ports K' K² K³. In the forward drive position the slots v² and the adjacent slots V register with the motor outlet ports j' j² j³, and the slots v' and the adjacent slots V with the motor inlet ports k' k² k³. Thus in this position the slots V' and V² communicate with the slots v' and v² respectively through the slots V. The thickened portions S' and T' of the sleeves are provided with sockets S⁴ and T² respectively in which lie the spherical ends of rocking bars U'. These rocking bars U' pass through suitably shaped holes in the solid portions of the discs U and serve to maintain the slots V in the discs U in alignment when the gear is in the forward drive position.

To effect a change to a reverse drive the sleeve T is rotated through a right angle relative to the sleeve S. This brings the slots v² into communication with what were the inlet ports k' k² k³ of the motor member and the slots v' similarly into communication with what were the outlet ports j' j² j³ of the motor member. The discs U are simultaneously rotated owing to the rocking bars U' through progressive angular distances so that they take up an echelon formation. A plan of the valve member when it has thus been set for a reverse drive is shown in Figure 4. It will be seen that the pump outlet ports J' J² J³ are now in communication through the slots V', V and v' with what were the motor outlet ports j' j² j³ in the forward drive position. Similarly the slots V², V and v² place the pump inlets ports K' K² K³ in communication with what were the motor inlet ports k' k² k³, and a reverse drive is obtained.

Rigidly secured to the end of the inner sleeve S is a collar W, and the outer sleeve T abuts a washer W' placed against the collar. This prevents relative axial movement of the sleeves S and T and therefore when the collar W is moved axially the valve is slid along the shaft B to effect a change of speed ratio. A fork W⁶ and a rod W⁸ may be used to actuate the collar W. Another collar W² is mounted loosely on the sleeve T and carries studs W³ which run in axial slots W⁴ in this sleeve. Thus the collar W² is free to slide axially relative to the sleeve T but cannot rotate relative thereto. The studs W³ project right through the sleeve T into helical grooves W⁵ in the sleeve S. Thus when the collar W² is moved axially the studs W³ slide in grooves W⁴ and W⁵ and effect a relative displacement of the sleeves S and T. Since S cannot rotate, due to the studs S', the sleeve T is rotated upon the sleeve S and the valve takes the position illustrated in Figure 4 and reverses the drive as has been explained. A fork W⁷ and rod W⁹ may be used to actuate the collar W². It will be seen that a number of reverse speeds may be obtained by sliding the valve member axially when it has been set for a reverse drive.

The operation of the gear to obtain varying speed ratios both for forward and for reverse drive will now be described. When the valve member occupies its extreme right hand position the three sets of pump ports K' J', K² J², K³ J³ in the cylindrical liner F are open to the valve slots V' V² V, but due to the length of the valve member, the valve slots V', V² cannot communicate with any of the motor ports. Oil therefore cannot escape from the pressure chambers and the slugs of oil imprisoned between the vanes and the abutments cause the casing to rotate at the same speed as the driver, or in effect the gear becomes a solid coupling. When the gear is thus used, the brake drum C' is released. The release is accomplished in any suitable manner (not shown) but is preferably effected by the same means which operates the rod W⁸, so that the brake is automatically released when the control device is shifted to direct drive position and is automatically set when the control is set for any reduced speed.

The dimensions of the valve and the spacing of the ports are such that by sliding the valve to the left varying numbers of pump chambers or ports may be placed in communication with varying numbers of motor ports, according to the following table:

| Position of valve. | Number of ports open to valve. | | Speed ratio. |
|---|---|---|---|
| | Pump. | Motor. | |
| 1 | 3 | 0 | Unity. |
| 2 | 3 | 1 | |
| 3 | 2 | 1 | |
| 4 | 2 | 2 | Lower. |
| 5 | 1 | 2 | |
| 6 | 1 | 3 | |
| 7 | 0 | 3 | Zero. |

The position of the valve determines the speed ratio. Thus in position 2 all pump chambers are in communication with one motor chamber and some of the oil in the pump may be displaced. As the shaft B is rotated the pump will tend to rotate the casing, as previously described for direct drive, and due to the opposing torque set up by the driven apparatus connected to E, pressure will be created in the working chambers. However, since some of the oil in these chambers may now be displaced, there will be a certain amount of slip between the driver and the rotor. This will result in a reduction of speed of the rotor dependent on the amount of fluid and the number of pump chambers open, that is, on the relative number of pump and motor ports which are in communication. The oil displaced under pressure forces the motor vanes and abutments to rotate relatively to each other and since the vanes are now held stationary the fluid exerts a torque on the casing which assists the torque of the pump and thus maintains the increased torque necessary to drive the shaft E at the reduced speed. When the valve member is moved one further stage to the left the first set of pump ports J' K' cease to register with the slots $V^2$ V' and two sets of pump ports may be in communication with one set of motor ports. This produces a further reduction in the speed ratio. In the next position (shown in Figure 1) two sets of pump ports are open to two sets of motor ports. The valve member can be moved through a series of further stages towards the left gradually reducing the number of sets of pump ports open to the slots V and at the same time increasing the number of sets of motor ports open to these slots. When the valve member has been moved so that none of the pump ports are in communication with the valve slots V the operative fluid passes from the outlet ports of the pump member into the corresponding inlet ports of the pump member through the open space X at the end of the valve member. In this position no drive is transmitted at all and the casing remains stationary. This is the neutral position. To obtain a reverse drive the sleeve T is rotated, as already described, relative to the sleeve S, axial movement of the valve member thus adjusted producing a variation in the reverse speed ratio in a manner similar to that described for the forward drive.

Any suitable mechanism may be employed to actuate the valve member, as for example a rack and pinion mechanism, or it may be actuated hydraulically or in any other suitable manner. Such mechanism, which would be controlled in the normal manner by a gear change lever and a reversing lever, does not form part of the present invention.

The hollow shaft C on which the motor stator $a$ is mounted is arranged outside the sleeve T and is normally held against rotation by means of the brake drum C' which for the sake of clearness is shown as integral therewith. The interior of this brake drum C' is utilized in the construction illustrated as an oil reservoir, but a separate oil reservoir may be provided is desired, as for example mounted on the driving shaft B. A system of oil ducts is provided in the gear which serves the double purpose of lubricating and compensating for leakage in any of the operative spaces of the gear. This system will now be described in detail. A pendulum ring $C^2$ is arranged in the brake drum and carries a weight $C^3$ and two tubes $C^4$, $C^5$ of which one $C^4$ extends to very near the outside of the drum and serves to supply oil into the gear while the other $C^5$ serves as an outlet from the gear. The purpose of this weighted ring is as follows: When direct drive is used, the whole apparatus including drum and casing rotates, but when a reduced speed ratio is used the drum is held stationary. When the drum is stopped and held stationary the weight $C^3$ insures that the intake tube $C^4$ will point downward, thus collecting and supplying to the gear the fluid of maximum viscosity, which gravitates to the bottom of the reservoir. The tube $C^4$ leads into an annular chamber $C^6$ which communicates through a passage $C^7$ in the shaft C with the annular space $x$ at the end of the valve member. Other passages $C^{10}$ lead from the chamber $C^6$ to the depressions $x^2$ in the end plates $d^2$, through which other passages $x^3$ lead to the longitudinal ducts $x^4$, formed by grooves cut in the outer surface of the inner part $D^5$ of the casing as shown in Figure 2. These ducts $x^4$ open into the spaces $x^5$ formed by the depressions in the central cam block between the cam surfaces $h^2$. These spaces are connected by passages $H^4$ surrounding the bolts $H^3$ with the corresponding spaces $X^5$ on the other side of the central cam block. These spaces $X^5$ are similarly in communication with the spaces $X^2$ in the cam surfaces $D^2$ through ducts $X^4$ and passages $X^3$, and these spaces $X^2$ in turn communicate through the passages X' with the annular space X at the end of the valve member. In an alternative arrangement the ducts $x^4$ $X^4$ are formed by grooves cut in the outer part $D^4$ of the casing instead of in the inner part $D^5$. The connection of spaces $X^2$ and $X^5$ by the ducts $X^4$ and likewise the connection of $x^2$ and $x^5$ by $x^4$ provides communication between them, and consequently as the vanes are shifted from one end to the other by cams, oil can be displaced from one space to the other and thus a balance of fluid pressure on the vanes is maintained. A small clearance is left between the driving shaft B and the sleeve S of the valve member, and the space Y thus left clear serves as a return passage to the oil reservoir in the brake drum C'. Holes Y' pass through the sleeve S and register with holes $Y^2$ in the sleeve T, which in turn communicate with the annular chamber $C^8$ connected to the outlet tube $C^5$ in the oil reservoir. The annular chamber $C^8$ extends a sufficient distance axially always to register with the holes $Y^2$ when the valve member is moved axially. It is desirable also to provide four pairs of holes $Y'$ $Y^2$ so that they will register with one another both in the forward drive position and in the reverse drive position when the sleeves S and T have been rotated relatively through a right angle. Any small quantity of air that may happen to be present will soon find its way into the centre of the gear owing to centrifugal action and will be led out to the oil reservoir through the space Y.

To compensate for any leakage of oil which may occur from the operative spaces of the gear, passages Z are formed longitudinally in the thickened portion $T'$ of the sleeve T, their ends being closed by balls $Z'$. These balls lie in chambers $Z^2$ and are prevented from rolling out of these chambers by pins $Z^3$. The inner ends of the chambers $Z^2$ communicate through transverse passages $Z^4$ with the slots $v'$ and $v^2$. This arrangement forms a non-return valve and allows oil to enter the slots $v'$ $v^2$ from the space $x$ to fill any voids that may have been formed in the operative spaces by leakage. In the thickened portion $S'$ of the other sleeve S, ducts $Z^5$ are provided leading from one slot $V'$ to the other slot $V'$ and also from one slot $V^2$ to the other slot $V^2$. These ducts $Z^5$ serve to equalize pressures in opposite spaces and thus ensure a balance of the pressure couple throughout the whole working system. These ducts are shown clearly in Figure 3.

A small air hole $C^9$ is provided near the centre of the reservoir so as to maintain the interior at atmospheric pressure. This hole is necessary to ensure that there will be a suction through the supply tube $C^4$ to the non-return valves to compensate for leakage, and to create a path of least resistance for the escape of any air that may be present in the gear through the return ducts. This hole also compensates for the slight change of volume of the fluid-filled spaces in the gear which occurs when the valve member is moved since the space X has a slightly larger cross section than the space $x$.

As has already been mentioned an independent passage from the reservoir to the space $x$ is provided so that there will be a direct draw of high viscosity fluid from the periphery of the reservoir to supply the non-return valves to compensate for leakage. Although this is the preferred arrangement it is not essential and passages analogous to $X'$ may be provided instead leading from the space $x$ to the adjacent cam spaces $x^2$. The details of the system may be varied within wide limits to suit requirements.

Although the invention has been described in detail with reference to the employment of pump and motor members of the fixed abutment type having axially sliding vanes, it is not so restricted, and any other type, as for example the turbo-compressor type, may be employed which is such that the working spaces of the pump and motor members enlarge and diminish circumferentially. As has already been indicated with reference to certain details the construction and arrangement of parts may be varied within wide limits without departing from the spirit of the invention.

What I claim as my invention and desire to secure by Letters Patent is:—

1. A variable speed gear adapted to be operated differentially by fluid pressure, comprising a rotary pump member to which the power is applied, a motor member coaxial therewith and normally held stationary, a casing from which the work is taken, such casing enclosing the pump and motor members and rotating differentially relative thereto, a cylindrical liner rigidly connected to the casing and having ports in its wall communicating with the working chambers of the pump and motor members, and means for regulating the passage of fluid between these members, the pump and motor members having working chambers which enlarge and diminish circumferentially as set forth.

2. A variable speed gear adapted to be operated differentially by fluid pressure, comprising a rotary pump member to which the power is applied, a motor member coaxial therewith, means acting normally to hold the motor member against rotation, a casing from which the work is taken, such casing enclosing the pump and motor members and rotating differentially relative thereto, a cylindrical liner rigidly connected to the casing and having ports in its wall communicating with the working chambers of the pump and motor members, and a valve member controlling the ports in the cylindrical liner, the fluid pressures in the pump and motor members being caused to act circumferentially and symmetrically while the moving parts of the gear are arranged symmetrically as set forth.

3. A variable speed gear adapted to be operated differentially by fluid pressure, comprising a rotary pump member to which the power is applied, a motor member coaxial therewith and normally held stationary, vanes adapted to slide axially in grooves in the pump member, vanes adapted to slide axially in grooves in the motor member, a casing from which the work is taken, such casing enclosing the pump and motor members and rotating differentially relative thereto, abutments symmetrically mounted on the casing and projecting into the working chambers of the pump and motor members, cams fixed to the casing and adapted to cause the vanes to slide axially as the members rotate relative to the casing, and means for regulating the passage of fluid between the pump and motor members as set forth.

4. A variable speed gear adapted to be operated differentially by fluid pressure, comprising a rotary pump member to which the power is applied, a motor member coaxial therewith and normally held stationary, vanes adapted to slide axially in grooves in the pump member, vanes adapted to slide axially in grooves in the motor member, a casing from which the work is taken, such casing enclosing the pump and motor members and rotating differentially relative thereto, abutments symmetrically mounted on the casing and projecting into the working chambers of the pump and motor members, cams fixed to the casing and adapted to cause the vanes to slide axially as the members rotate relative to the casing, a cylindrical liner rigidly connected to the casing and having ports in its wall communicating with the working chambers of the pump and motor members, and a valve member controlling the ports in the cylindrical liner as set forth.

5. A variable speed gear adapted to be operated differentially by fluid pressure, comprising a rotary pump member, a motor member coaxial therewith, vanes adapted to slide axially in grooves in the pump member, vanes adapted to slide axially in grooves in the motor member, a casing enclosing the pump and motor members and rotating differentially relative thereto, abutments symmetrically mounted on the casing and projecting into the working chambers of the members, cams fixed to the casing and adapted to cause the vanes to slide axially as the members rotate relative to the casing, and means for regulating the passage of fluid between the pump and motor members, the pump member and the parts associated therewith being constructed and arranged in a manner similar to the motor member and the corresponding associated parts as set forth.

6. A variable speed gear adapted to be operated differentially by fluid pressure, comprising a rotary pump member to which the power is applied, a motor member coaxial therewith and normally held stationary, a casing from which the work is taken, such casing enclosing the pump and motor members and rotating differentially relative thereto, an axially movable valve member adapted to place working chambers of the pump member in communication with working chambers of the motor member, and means for causing the valve member to move axially thus varying the number of pump working chambers and the number of motor working chambers placed in communication with one another, as set forth.

7. A variable speed gear adapted to be operated differentially by fluid pressure, comprising a rotary pump member to which the power is applied, a motor member coaxial therewith and normally held stationary, vanes adapted to slide axially in grooves in the pump member, vanes adapted to slide axially in grooves in the motor member, a casing from which the work is taken, such casing enclosing the pump and motor members and rotating differentially relative thereto, abutments symmetrically mounted on the casing and projecting into the working chambers of the pump and motor members, cams fixed to the casing and adapted to cause the vanes to slide axially as the members rotate relative to the casing, a cylindrical liner connected to the casing and having ports in its wall communicating with the working chambers of the pump and motor members, an axially movable valve member adapted to place pump ports in the cylindrical liner in communication with motor ports therein, and means for causing the valve member to slide axially thus varying the number of pump ports and the number of motor ports placed in communication with one another as set forth.

8. A variable speed gear adapted to be operated differentially by fluid pressure, comprising a rotary pump member to which the power is applied, a motor member coaxial therewith and normally held stationary, a casing from which the work is taken, such casing enclosing the pump and motor members and rotating differentially relative thereto, a valve member adapted to place working chambers of the pump member in communication with working chambers of the motor member, and means for adjusting the valve member whereby a reverse drive is obtained as set forth.

9. A variable speed gear adapted to be operated differentially by fluid pressure, comprising a rotary pump member to which the power is applied, a motor member coaxial therewith and normally held stationary, a casing from which the work is taken, such casing enclosing the pump and motor members and rotating differentially relative thereto, an axially movable valve member adapted to place working chambers of the pump member in communication with working chambers of the motor member, means for causing the valve member to slide axially into positions corresponding to various forward speed ratios, and means for adjusting the valve member by relative rotation of its constituent parts whereby a reverse drive is obtained, axial movement of the valve member thus adjusted effecting a change in the reverse speed ratio as set forth.

10. A variable speed gear adapted to be operated differentially by fluid pressure, comprising a rotary pump member to which the power is applied, a motor member coaxial therewith and normally held stationary, a casing from which the work is taken, such casing enclosing the pump and motor members and rotating differentially relative thereto, and a valve member disposed concentrically within the pump and motor members and adapted to control the passage of fluid between these members as set forth.

11. A variable speed gear adapted to be operated differentially by fluid pressure, comprising a rotary pump member to which the power is applied, a motor member coaxial therewith, means acting normally to hold the motor member against rotation, a casing from which the work is taken, such casing enclosing the pump and motor members and rotating differentially relative thereto, a cylindrical liner rigidly connected to the casing and having ports in its wall communicating with the working chambers of the pump and motor members, an axially movable valve member disposed concentrically within the cylindrical liner and controlling the ports in the wall thereof, and means for causing the valve member to slide axially, the pump and motor members being disposed in the annular space between the casing and the cylindrical liner as set forth.

12. A variable speed gear adapted to be operated differentially by fluid pressure, comprising a rotary pump member to which the power is applied, a motor member coaxial therewith and normally held stationary, vanes adapted to slide axially in grooves in the pump member, vanes adapted to slide axially in grooves in the motor member, a casing from which the work is taken, such casing enclosing the pump and motor members and rotating differentially relative thereto, abutments symmetrically mounted on the casing and projecting into the working chambers of the pump and motor members, cams fixed to the casing and adapted to cause the vanes to slide axially as the members rotate relative to the casing, and a valve member disposed concentrically within the pump and motor members and adapted to control ports communicating through radial passages with the working chambers of these members as set forth.

13. A variable speed gear adapted to be operated differentially by fluid pressure, comprising a rotary pump member, a motor member coaxial therewith, vanes adapted to slide axially in grooves in the pump member, vanes adapted to slide axially in grooves in the motor member, a casing enclosing the pump and motor members and rotating differentially relative thereto, abutments symmetrically mounted on the casing and projecting into the working chambers of the members, cams fixed to the casing and adapted to cause the vanes to slide axially as the members rotate relative to the casing, a cylindrical liner rigidly connected to the casing and having ports in its wall communicating through radial passages with the working chambers of the pump and motor members, and a valve member disposed concentrically within the cylindrical liner and controlling the ports in the wall thereof, the pump and motor members being disposed in the annular space between the casing and the cylindrical liner, the pump member and the parts associated therewith being constructed and arranged in a manner similar to the motor member and the corresponding associated parts as set forth.

14. A variable speed gear adapted to be operated differentially by fluid pressure, comprising a pump member to which the power is applied, a motor member coaxial therewith and normally held stationary, a casing from which the work is taken, such casing enclosing the pump and motor members and rotating differentially relative thereto, an axially movable valve member disposed concentrically within the pump and motor members and adapted to control ports in these members communicating with the working chambers thereof, this valve member comprising an inner sleeve, an outer sleeve riding on the inner sleeve, and a number of discs also riding on the inner sleeve, the sleeves and the discs being slotted to form connecting passages between the pump ports and the motor ports, means for moving the whole valve member axially for varying the number of pump ports and the number of motor ports connected together by the slots in the valve member whereby a change in the speed ratio is effected, and means for rotating one sleeve relative to the other sleeve whereby the discs are rotated through progressive angular distances and a reverse drive is obtained as set forth.

15. A variable speed gear adapted to be operated differentially by fluid pressure, comprising a rotary pump member, a motor member coaxial therewith, vanes adapted to slide axially in grooves in the pump member, vanes adapted to slide axially in grooves in the motor member, a casing enclosing the pump and motor members and rotating differentially relative thereto, abutments symmetrically mounted on the casing and projecting into the working chambers of the members, cams fixed to the casing and adapted to cause the vanes to slide axially as the members rotate relative to the casing, a cylindrical liner rigidly connected to the casing and having ports in its wall communicating through radial passages with the working chambers of the pump and motor members, and a valve member disposed concentrically within the cylindrical liner and controlling the ports in the wall thereof, this valve member comprising an inner sleeve, an outer sleeve riding on the inner sleeve, a number of discs also riding on the inner sleeve, the sleeves and the discs being slotted to form connecting passages between the pump ports and the motor ports, and means for rotating one of the sleeves relative to the other sleeve whereby the discs are rotated through progressive angular distances, the pump member and the parts associated therewith being constructed and arranged in a manner similar to the motor member and the corresponding associated parts as set forth.

16. A variable speed gear adapted to be operated differentially by fluid pressure, comprising a rotary pump member to which the power is applied, a motor member coaxial therewith and normally held stationary, a casing from which the work is taken, such casing enclosing the pump and motor members and rotating differentially relative thereto, a valve member controlling the passage of fluid between the pump and motor members, a reservoir for the operative fluid, ducts serving to convey this fluid from the reservoir to the working spaces in the gear to compensate for any leakage that may occur therefrom, and ducts serving to connect diametrically opposite spaces in the gear whereby a balance of fluid pressures is obtained as set forth.

17. A variable speed gear adapted to be operated differentially by fluid pressure, comprising a rotary pump member, a motor member coaxial therewith, vanes adapted to slide axially in grooves in the pump member, vanes adapted to slide axially in grooves in the motor member, a casing enclosing the pump and motor members and rotating differentially relative thereto, abutments symmetrically mounted on the casing and projecting into the working chambers of the members, cams fixed to the casing and adapted to cause the vanes to slide axially as the members rotate relative to the casing, and means for regulating the passage of fluid between the pump and motor members, a reservoir for the operative fluid, ducts serving to convey this fluid from the reservoir to the working spaces in the gear, return ducts serving to convey fluid back to the reservoir together with any air which may be present in this fluid, and ducts serving to connect diametrically opposite spaces in the gear whereby a balance of fluid pressures is obtained as set forth.

18. A variable speed gear adapted to be operated by fluid pressure, comprising a rotary pump member to which the power is applied, a motor member coaxial therewith, vanes adapted to slide axially in grooves in the pump member, vanes adapted to slide axially in grooves in the motor member, a casing enclosing the pump and motor members, abutments symmetrically mounted on the casing and projecting into the working chambers of the pump and motor members, cams fixed to the casing and adapted to cause the vanes to slide axially as the members rotate relative to the casing, a cylindrical liner rigidly connected to the casing and having ports in its wall communicating with the working chambers of the pump and motor members, and a valve member controlling the ports in the cylindrical liner as set forth.

19. A variable speed gear adapted to be operated by fluid pressure, comprising a rotary pump member, a motor member coaxial therewith, vanes adapted to slide axially in grooves in the pump member, vanes adapted to slide axially in grooves in the motor member, a casing enclosing the pump and motor members, abutments symmetrically mounted on the casing and projecting into the working chambers of the members, cams fixed to the casing and adapted to cause the vanes to slide axially as the members rotate relative to the casing, and means for regulating the passage of fluid between the pump and motor members, the pump member and the parts associated therewith being constructed and arranged in a manner similar to the motor member and the corresponding associated parts as set forth.

In testimony whereof I have signed my name to this specification.

MAXWELL MABERLY SMITH.